(12) United States Patent
Friend et al.

(10) Patent No.: US 6,497,388 B1
(45) Date of Patent: Dec. 24, 2002

(54) COMMON FLIGHT DECK MODULE FOR FAMILY OF COMMERCIAL AIRCRAFT

(75) Inventors: Michael G. Friend, Newcastle, WA (US); Jay R. Huffington, Enemclaw, WA (US); Mark E. Eakins, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/944,967

(22) Filed: Aug. 31, 2001

(51) Int. Cl.$^7$ ................................................ B64C 1/00
(52) U.S. Cl. ...................................... 244/120; 244/141
(58) Field of Search ............................ 244/117 R, 119, 244/120, 140, 141

(56) References Cited

U.S. PATENT DOCUMENTS

| | | | | |
|---|---|---|---|---|
| 2,263,365 A | * | 11/1941 | Nicolaus et al. | 244/120 |
| 2,702,680 A | * | 2/1955 | Heinemann et al. | 244/141 |
| 2,778,586 A | * | 1/1957 | Nyerges et al. | 244/120 |
| 3,999,728 A | * | 12/1976 | Zimmer | 244/140 |
| 4,741,497 A | * | 5/1988 | Fox | 244/117 R |
| 6,070,831 A | * | 1/2000 | Vassiliev et al. | 244/120 |
| 6,129,308 A | * | 10/2000 | Nastasi et al. | 244/120 |

* cited by examiner

*Primary Examiner*—Galen L. Barefoot
(74) *Attorney, Agent, or Firm*—Harness, Dickey & Pierce, P.L.C.

(57) ABSTRACT

A common flight deck module for use with a plurality of aircraft platforms. The common flight deck module includes a discrete structure that is independent of the structure of the aircraft fuselage and may includes an avionics system and other hardware, controls and equipment. The common flight deck module is configured to "plug into" the fuselage from each of the aircraft platforms. The "plug in" modularity of the common flight deck module permits the standardization of various components and procedures to thereby make possible efficiency-based cost reductions for both aircraft manufacturers and aircraft consumers.

14 Claims, 4 Drawing Sheets

COMMON FLIGHT DECK MODULE FOR FAMILY OF COMMERCIAL AIRCRAFT

FIELD OF THE INVENTION

The present invention generally relates to commercial transport aircraft and more particularly to the use of a common flight deck module in the fabrication of a plurality of differently sized commercial transport aircraft platforms.

BACKGROUND OF THE INVENTION

Manufacturers of modern commercial transport aircraft typically produce a plurality of differently sized aircraft configurations so that they are able to provide appropriately sized aircraft to meet the needs of their customers. One common approach to vary the capacity of an aircraft is to add segments to the fuselage on either side of the wing. Large changes in capacity, however, necessitate the creation of a new aircraft platform wherein the diameter of the fuselage is changed (i.e., the fuselage of one platform will have a cross-sectional area that is distinct from the cross-sectional area of the fuselage of a different platform). Despite the widespread use of the latter approach, several drawbacks have been noted.

One such drawback concerns the commonality between the aircraft platforms. In view of the differences in the availability of space in each of the platforms, the complexity of the aircraft avionics and the crew capacity, the crew portion of the cabin of an aircraft is typically configured in a manner that is unique to its aircraft platform.

The unique configuration of the crew portion of a cabin, however, is undesirable to the aircraft manufacturer in that each platform must incur costs to develop the crew portion of the cabin, integrate the crew portion of the cabin to the airframe, as well as fabricate and store spare parts that are unique to the design of the crew portion of the cabin. The unique configuration of the crew portion of a cabin is also undesirable to the aircraft customer in that the customer must incur costs to train its staff for each configuration, as well as procure and store spare parts that are unique to each configuration.

Accordingly, there remains a need in the art for a crew module that may be integrated into a plurality of aircraft platforms. A crew module that is common to several aircraft platforms permits the costs for the development and certification of the crew module and its integration into the airframe to be shared over several aircraft platforms. Additionally, the use of a common flight deck module across several platforms substantially reduces the amount of resources that must be dedicated to training and the procurement and storage of spare parts.

SUMMARY OF THE INVENTION

In one preferred form, the present invention provides a method for fabricating an aircraft that includes the steps of: providing a flight deck module having an avionics suite with at least one exterior window aperture; generating a build order for an aircraft, the aircraft being selected from a plurality of aircraft platforms, each of the aircraft platforms having a fuselage and a predetermined capacity, wherein each of the fuselages is sized differently and wherein each of the capacities is different and wherein the flight deck module is compatible with each of the plurality of aircraft platforms; fabricating at least a portion of an associated fuselage of the aircraft; and fixedly coupling the flight deck module and the associated fuselage to one another to integrate the flight deck module into the aircraft.

In another preferred form, the present invention provides a commercial transport aircraft that includes a flight deck module having a discrete module structure and at least one exterior window aperture and a fuselage having a discrete fuselage structure with a flight deck aperture configured to receive the flight deck module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
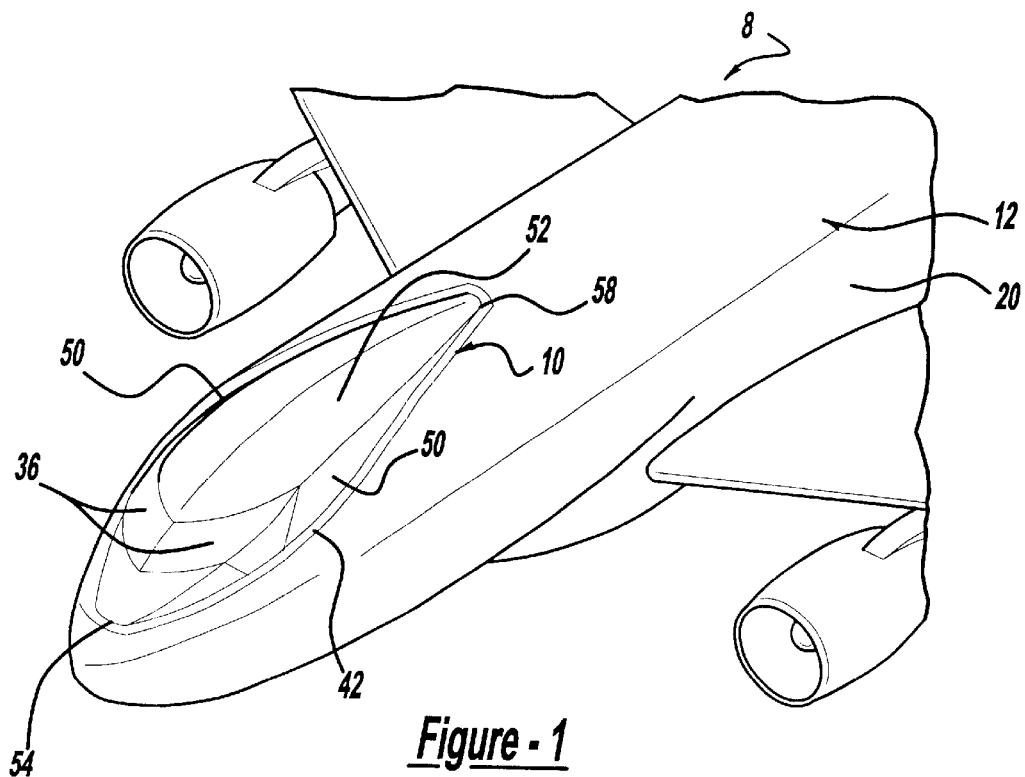
FIG. 1 is a perspective view of a common flight deck module constructed in accordance with the teachings of the present invention and illustrated in operative association with an aircraft of a first aircraft platform.

With reference to FIG. 1 of the drawings, an aircraft 8 is illustrated to include a common flight deck module that is constructed in accordance with the teachings of the present invention and which is generally indicated by reference numeral 10. The common flight deck module 10 is illustrated in operative association with an aircraft structure 12 that is based on a first aircraft platform. In this regard, the aircraft structure 12 includes a fuselage 20 of a first size, which in the particular embodiment illustrated, is characterized by a first external diameter.

Figure 2:
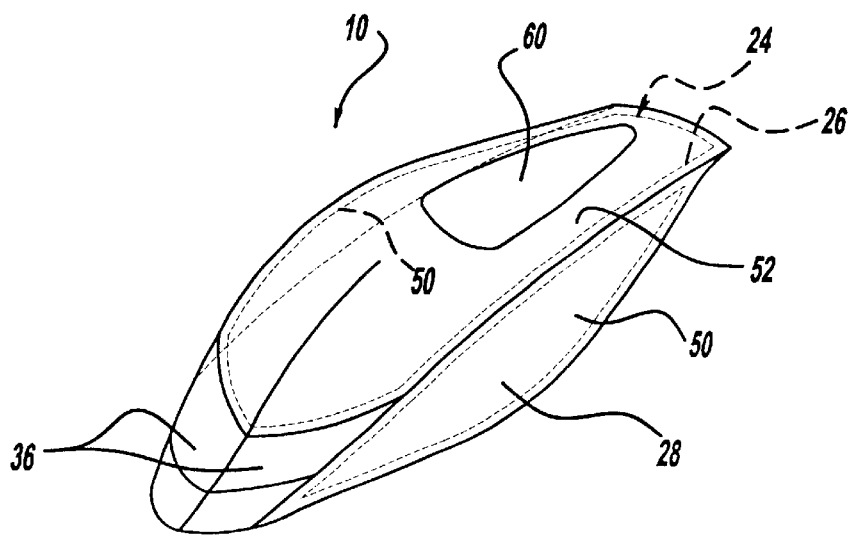
FIG. 2 is a perspective view of the common flight deck module of FIG. 1.
Figure 3:
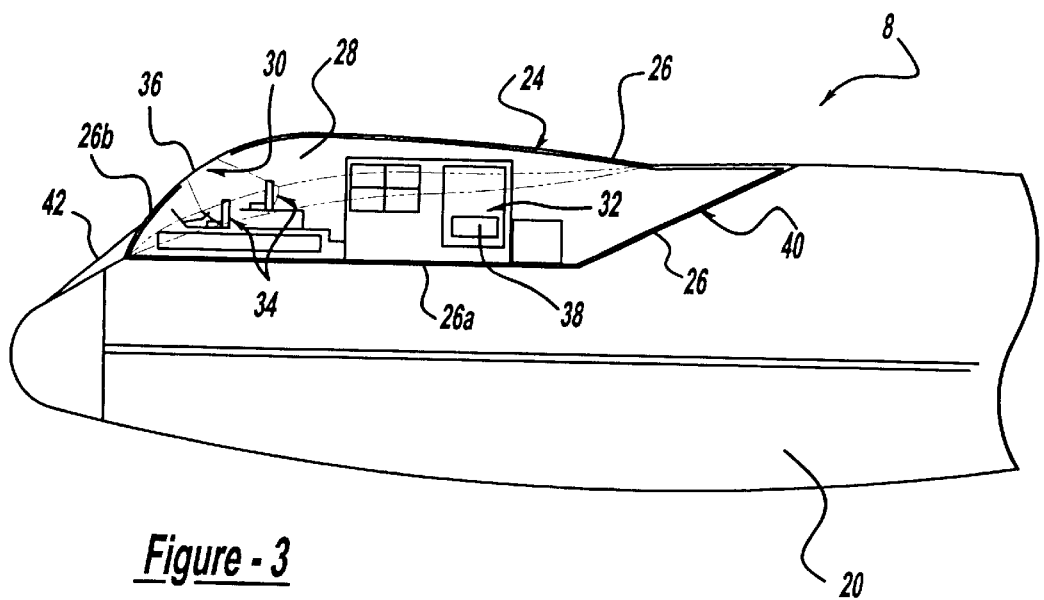
FIG. 3 is side view of the aircraft of FIG. 1 in partial section.
Figure 4:
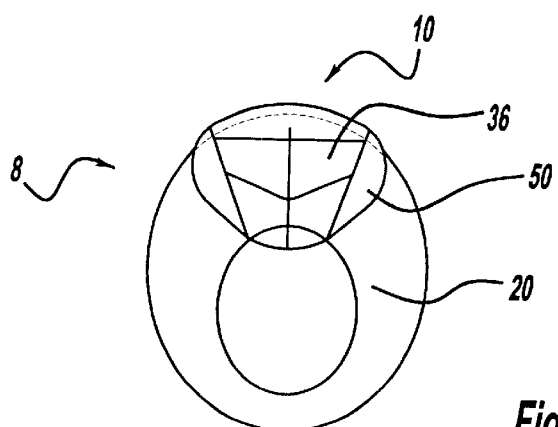
FIG. 4 is a front view of the aircraft illustrated in FIG. 1.

With additional reference to FIGS. 2 through 4, the common flight deck module 10 is illustrated to include a module structure 24 having a plurality of structural members 26, such as a cabin floor 26a and a forward pressure bulkhead 26b, and a body structure 28, which is fitted over the structural members 26 and configured to form a portion of the exterior of the aircraft 8. The structural members 26 and body structure 28 cooperate to form a discrete and independent structure defining at least one exterior window aperture 30, an avionics suite 32 and a plurality of crew stations 34 that would be employed by the pilot and other flight personnel during the operation of the aircraft 8. Preferably, the common flight deck module 10 also includes one or more window units 36 and all other hardware and equipment, including an avionics system 38, that would be utilized by a crew during the operation of the aircraft 8. In this regard, the common flight deck module 10 is preferably a substantially completely subassembled crew cockpit with all aspects of the flight deck encompassed within the periphery of the common flight deck module 10.

The aircraft structure 12 includes a module aperture 40 that is configured to receive the common flight deck module 10. Although the aircraft structure 12 is also discrete and independent, the aircraft structure 12 and the module structure 24 are configured to be fixedly coupled together via conventional fasteners (not shown) such that operational loads are transmitted through the airplane 8 in an efficient and structurally sound manner. After the common flight deck module 10 and the aircraft structure 12 have been fixedly coupled together, a fairing 42 is employed to smooth the exterior surface of the aircraft 8 and reduce drag.

In the particular embodiment illustrated, the common flight deck module 10 has a pair of opposite sidewalls 50 that extend upwardly from the fuselage 20 of the aircraft structure 12. The sidewalls 50 terminate at a top surface 52 that tapers rearwardly and upwardly from a leading edge 54 of the common flight deck module 10 to a transition point between the leading edge 54 and a trailing edge 58 of the common flight deck module 10. Thereafter, the top surface 52 tapers rearwardly and downwardly from the transition point to the trailing edge 58 to provide the common flight deck module 10 with a bubble-like appearance that is highly aerodynamic and which substantially reduces wind noise as compared with the commercial transport aircraft that employ planar window elements. Furthermore, as a portion of the common flight deck module 10 extends above the fuselage 12, flight deck visibility is enhanced, and provisions for rearward viewing are obtained though the use of an optional rear window unit 60 (FIG. 2).

Figure 5:
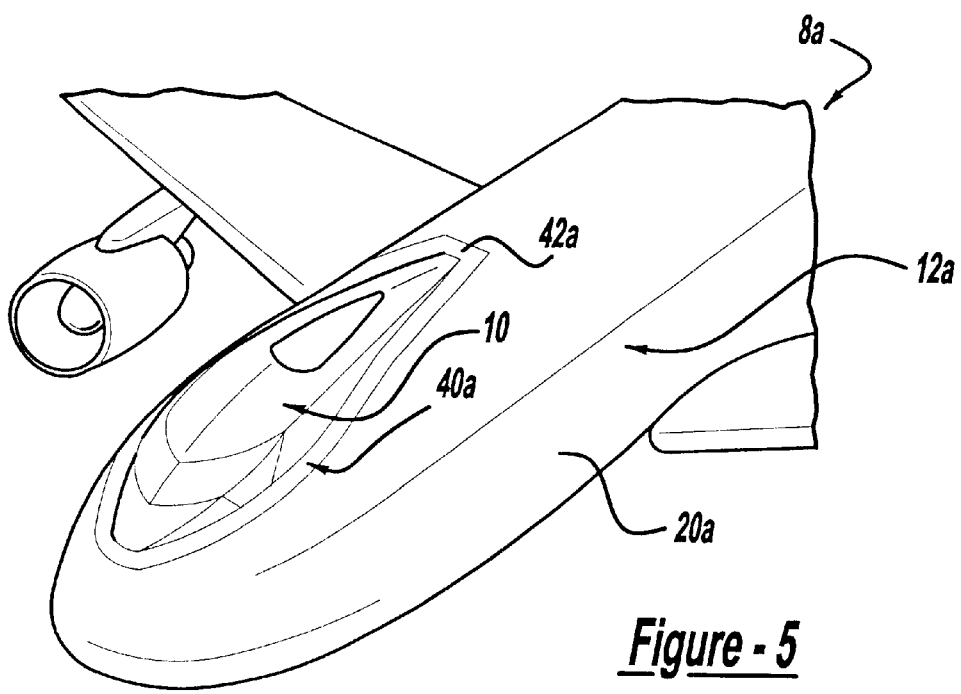
FIG. 5 is a perspective view similar to that of FIG. 1 but illustrating the common flight deck module as integrated into an aircraft of a second, smaller aircraft platform.
Figure 6:
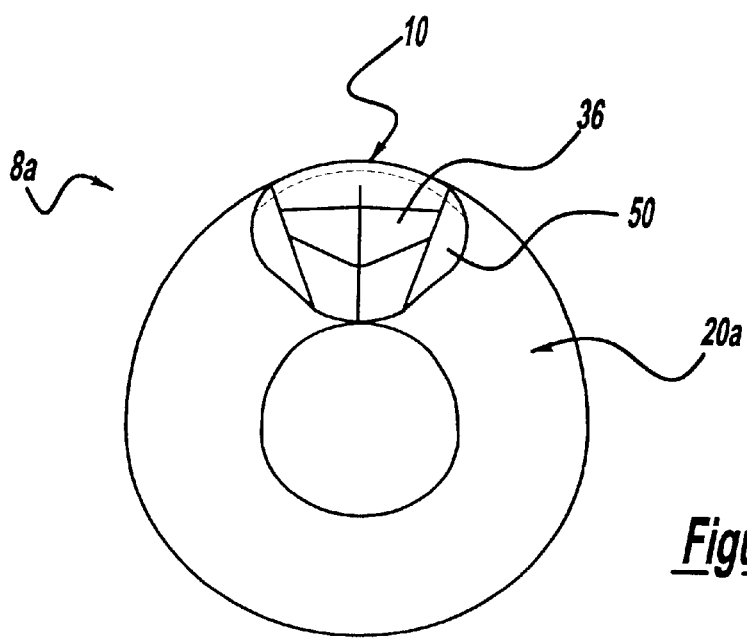
FIG. 6 is a front view of the aircraft of FIG. 5.

With reference to FIGS. 5 and 6, an aircraft 8a having an aircraft structure 12a that is based off a second, somewhat larger aircraft platform is illustrated in operative association with the common flight deck module 10. The aircraft structure 12a includes a fuselage 20a of a second size, which in the particular embodiment illustrated, is characterized by a second external diameter that is relatively larger than the first external diameter. Like the fuselage 20, the fuselage 20a is discrete and independent of the common flight deck module 10, and includes a module aperture 40a that is configured to receive the common flight deck module 10. In a manner similar to that described above, the aircraft structure 12a and the module structure 24 (FIG. 3) are configured to be fixedly coupled together via conventional fasteners (not shown) such that operational loads are transmitted through the airplane 8a in an efficient and structurally sound manner. After the common flight deck module 10 and the aircraft structure 12a have been fixedly coupled together, a fairing 42a is employed to smooth the exterior surface of the aircraft 8a and reduce drag.

Figure 7:
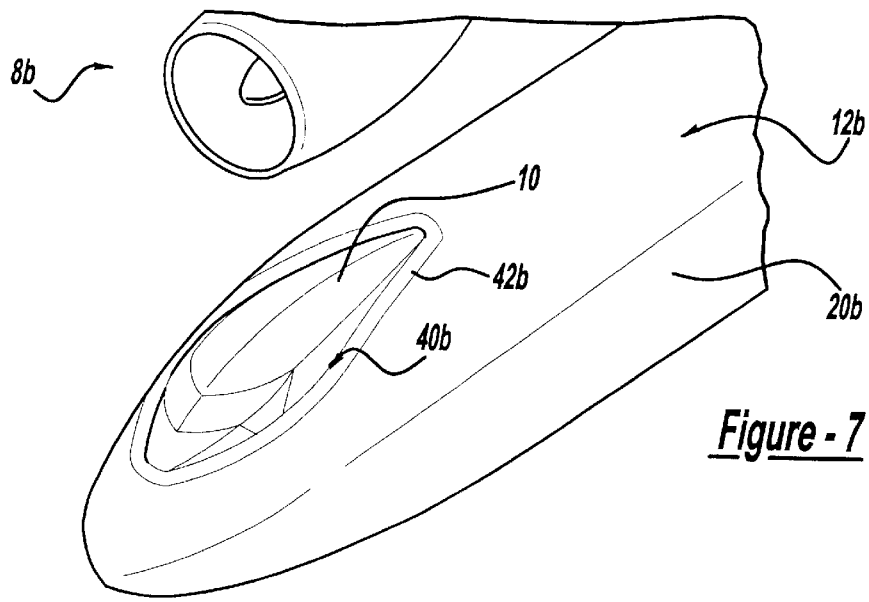
FIG. 7 is a perspective view similar to that of FIG. 1, but illustrating the common flight deck module as integrated into an aircraft of a third, larger aircraft platform.
Figure 8:
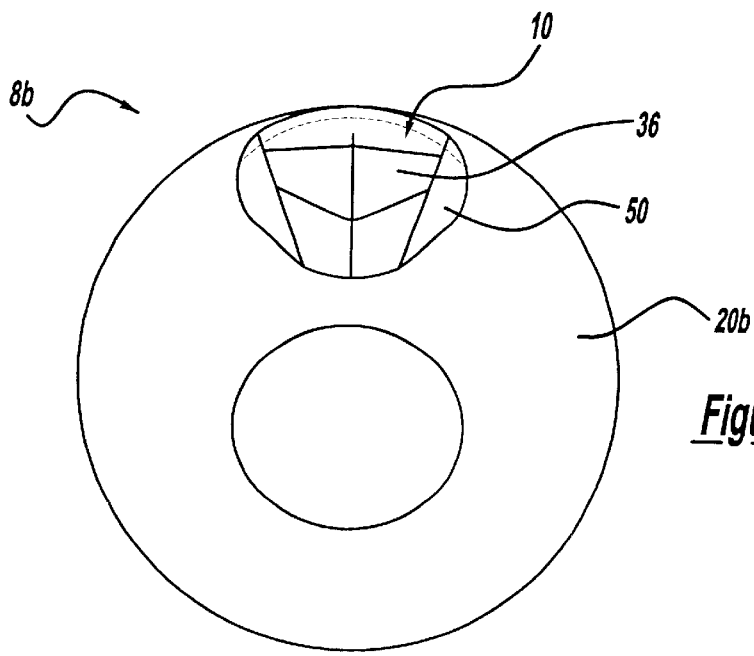
FIG. 8 is a front view of the aircraft of FIG. 7.

With reference to FIGS. 7 and 8, an aircraft 8b having an aircraft structure 12b that is based off a third, relatively larger aircraft platform is illustrated in operative association with the common flight deck module 10. The aircraft structure 12b includes a fuselage 20b of a third size, which in the particular embodiment illustrated, is characterized by a third external diameter that is relatively larger than the first external diameter. Like the fuselage 20, the fuselage 20b is discrete and independent of the common flight deck module 10, and includes a module aperture 40b that is configured to receive the common flight deck module 10. In a manner similar to that described above, the aircraft structure 12b and the module structure 24 are configured to be fixedly coupled together via conventional fasteners (not shown) such that operational loads are transmitted through the airplane 8b in an efficient and structurally sound manner. After the common flight deck module 10 and the aircraft structure 12b have been fixedly coupled together, a fairing 42b is employed to smooth the exterior surface of the aircraft 8a and reduce drag.

The "plug-in" modularity of the common flight deck module 10 provides tremendous flexibility in the aircraft manufacturing process and permits the aircraft manufacturer to substantially reduce the amount of time between the generation of a build order and the delivery of a finished aircraft. Generally, the customer is able to select an aircraft from the plurality of aircraft platforms, wherein each of the aircraft platforms has a fuselage with a predetermined capacity, and each of the fuselages is sized differently to provide the aircraft with a different capacity. Once a desired aircraft or aircraft platform has been selected, a sales order is generated to schedule the aircraft into a production schedule. One or more common flight deck modules 10 may be prebuilt prior to the generation of the build order or the fabrication of the common flight deck module 10 may be undertaken substantially simultaneously with the fabrication of the fuselage after the generation of the build order. When at least a portion of the aircraft's fuselage has been fabricated, the common flight deck module 10 is mated to and fixedly coupled with the fuselage. As noted above, the common flight deck module 10 is preferably a substantially completely subassembled crew cockpit with all aspects of the flight deck encompassed within the periphery of the common flight deck module 10. As such, it is preferred that all hardware, instrumentation, controls and other equipment, including the avionics system 38, be integrated into the common flight deck module 10 before the module is mated to the fuselage.

Since the common flight deck module 10 is used across each of the first, second and third aircraft platforms, the volumes of each of the components of common flight deck module 10 are used at a relatively higher volume, thereby reducing the overall cost of the common flight deck module 10 due to increased efficiency in production as well as the ability to amortize tooling and overhead over a relatively larger quantity of aircraft. Lead time is reduced through increased efficiency and the use of parallel production paths (i.e., one path for the fuselage and one path for the common flight deck module 10).

The common flight deck module 10 is highly advantageous to the aircraft consumer since it reduces both crew training and maintenance costs. Crew training costs are reduced through the use of training simulators and a training curricula that are common to each of the platforms. Maintenance costs are reduced through the standardization of repair parts and procedures.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for fabricating an aircraft, the method comprising the steps of:

providing a flight deck module having a module structure that defines an avionics suite and at least one exterior window aperture;

generating a build order for an aircraft, the aircraft being selected from a plurality of aircraft platforms, each of the aircraft platforms having a fuselage with a predetermined capacity, wherein each of the fuselages is sized with a different cross-sectional area and wherein the flight deck module is compatible with each of the plurality of aircraft platforms;

fabricating at least a portion of an associated fuselage of the aircraft; and fixedly coupling the flight deck module and the associated fuselage to one another to integrate the flight deck module into the aircraft.

2. The method of claim 1, wherein each of the fuselages has a generally hollow cylindrical shape and each of the fuselages is defined by a different exterior diameter.

3. The method of claim 1, wherein the flight deck module includes a pair of sidewalls, at least a portion of the sidewalls extending vertically upwardly from the associated fuselage.

4. The method of claim 3, wherein the flight deck module includes a top surface that tapers rearwardly and upwardly from a leading edge of the flight deck module to a transition point between the leading edge and a trailing edge of the flight deck module.

5. The method of claim 4, wherein the top surface of the flight deck module tapers rearwardly and downwardly from the transition point to the trailing edge.

6. The method of claim 1, wherein the flight deck module includes a cab floor and a forward pressure bulkhead.

7. The method of claim 1, wherein prior to the step of fixedly coupling the flight deck module and the fuselage, the method includes the steps of:

providing a set of flight deck avionics; and incorporating the set of flight deck avionics into the flight deck module.

8. A commercial transport aircraft comprising:

a flight deck module having a discrete module structure defining an avionics suite and at least one exterior window aperture; and a fuselage having a discrete fuselage structure with a flight deck aperture configured to receive the flight deck module;

wherein the flight deck module is configured to be fixedly coupled to the fuselage so as to be non-removable therefrom during flight; and wherein the flight deck module is configured to be employed in a plurality of discrete aircraft platforms wherein each aircraft platform includes a uniquely sized fuselage that has a cross-sectional area that is different from the fuselage of each other aircraft platform.

9. The commercial transport aircraft of claim 8, wherein the fuselage has a generally hollow cylindrical shape.

10. The commercial transport aircraft of claim 8, wherein the flight deck module includes a pair of sidewalls, at least a portion of the sidewalls extending vertically upwardly from the fuselage.

11. The commercial transport aircraft of claim 10, wherein the flight deck module includes a top surface that tapers rearwardly and upwardly from a leading edge of the flight deck module to a transition point between the leading edge and a trailing edge of the flight deck module.

12. The commercial transport aircraft of claim 11, wherein the top surface of the flight deck module tapers rearwardly and downwardly from the transition point to the trailing edge.

13. The commercial transport aircraft of claim 8, wherein the flight deck module includes a cab floor and a forward pressure bulkhead.

14. The commercial transport aircraft of claim 8, wherein the flight deck module includes a set of flight deck avionics.

* * * * *